US006990523B2

(12) United States Patent
Wu

(10) Patent No.: US 6,990,523 B2
(45) Date of Patent: *Jan. 24, 2006

(54) SYSTEM AND METHOD FOR SYNCHRONIZING OBJECTS BETWEEN TWO DEVICES

(75) Inventor: Charles Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/000,627

(22) Filed: Dec. 1, 2004

(65) Prior Publication Data

US 2005/0080896 A1 Apr. 14, 2005

Related U.S. Application Data

(63) Continuation of application No. 09/326,163, filed on Jun. 4, 1999, now Pat. No. 6,862,617.

(60) Provisional application No. 60/103,859, filed on Oct. 12, 1998.

(51) Int. Cl.
G06F 15/16 (2006.01)
(52) U.S. Cl. .................. 709/224; 709/225; 707/201
(58) Field of Classification Search ........ 709/220–225, 709/217, 219; 707/201, 203, 10; 717/168, 717/173; 710/5, 20
See application file for complete search history.

(56) References Cited

U.S. PATENT DOCUMENTS

| 5,392,390 A | 2/1995 | Crozier |
| 5,630,081 A | 5/1997 | Rybicki et al. |
| 5,684,990 A | 11/1997 | Boothby |
| 5,701,423 A | 12/1997 | Crozier |
| 5,710,922 A | 1/1998 | Alley et al. |
| 5,727,202 A | 3/1998 | Kucala |
| 5,729,735 A | 3/1998 | Meyering |
| 5,754,306 A | 5/1998 | Taylor et al. |
| 5,774,717 A | 6/1998 | Porcaro |
| 5,845,293 A | 12/1998 | Veghte et al. |

(Continued)

OTHER PUBLICATIONS

O'Hara "Microsoft Windows CE: A New Handheld Computing Platform" pp. 1-2, 1997.*

(Continued)

Primary Examiner—Larry D. Donaghue
(74) Attorney, Agent, or Firm—Lee & Hayes, PLLC

(57) ABSTRACT

A synchronization system synchronizes objects between a portable computer and a desktop computer. The portable computer is capable of communicating with a storage volume that can become inaccessible to the portable computer. The system identifies storage volumes currently available to the portable computer and identifies storage volumes previously accessible to the portable computer, but not currently accessible to the portable computer. Objects contained in storage volumes that are currently accessible to the portable computer are then synchronized between the base computer and the portable computer. During the synchronization process, the system ignores objects stored on volumes that are not currently accessible to the portable computer. However, the system continues to monitor and record changes to objects stored on volumes that are not currently accessible to the portable computer. When a storage volume that was previously inaccessible becomes accessible, the system synchronizes objects stored on the previously inaccessible storage volume. The objects may be databases or other data structures. The storage volume that can become inaccessible to the portable computer is typically a removable memory card that can be inserted into the portable computer.

8 Claims, 7 Drawing Sheets

U.S. PATENT DOCUMENTS

| | | |
|---|---|---|
| 5,884,323 A | 3/1999 | Hawkins et al. |
| 5,887,145 A | 3/1999 | Harari et al. |
| 5,897,640 A | 4/1999 | Veghte et al. |
| 5,974,238 A | 10/1999 | Chase, Jr. |
| 6,000,000 A | 12/1999 | Hawkins et al. |
| 6,006,274 A | 12/1999 | Hawkins et al. |
| 6,052,735 A | 4/2000 | Ulrich et al. |
| 6,125,369 A | 9/2000 | Wu et al. |
| 6,243,705 B1 | 6/2001 | Kucala |
| 6,272,545 B1 | 8/2001 | Flanagin et al. |
| 6,275,831 B1 | 8/2001 | Bodnar et al. |
| 6,295,541 B1 | 9/2001 | Bodnar et al. |
| 6,317,797 B2 * | 11/2001 | Clark et al. .................... 710/5 |
| 6,324,544 B1 | 11/2001 | Alam et al. |
| 6,330,568 B1 | 12/2001 | Boothby et al. |
| 6,330,618 B1 | 12/2001 | Hawkins et al. |
| 6,370,566 B2 | 4/2002 | Discolo et al. |
| 6,442,570 B1 | 8/2002 | Wu |
| 6,457,062 B1 | 9/2002 | Pivowar et al. |
| 6,463,427 B1 | 10/2002 | Wu |
| 6,633,924 B1 | 10/2003 | Wu et al. |
| 2001/0011308 A1 * | 8/2001 | Clark et al. .................... 710/20 |

OTHER PUBLICATIONS

Newton Connection Utilities User's Manual for the Macintosh Operating System, Apple Computer, pp. 1-109, 1997.

* cited by examiner

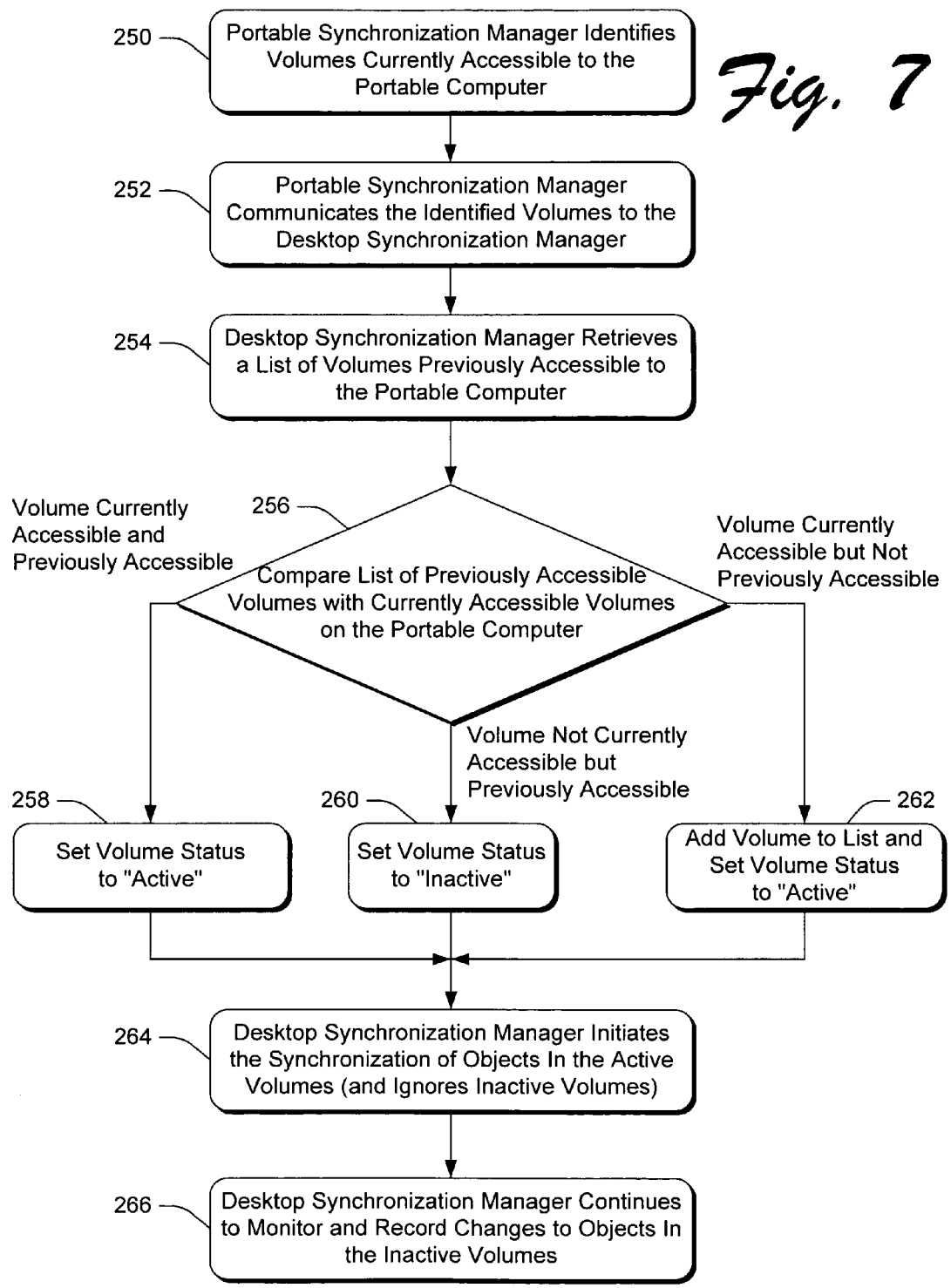

SYSTEM AND METHOD FOR SYNCHRONIZING OBJECTS BETWEEN TWO DEVICES

RELATED APPLICATIONS

This application is a continuation application of co-pending U.S. patent application Ser. No. 09/326,163, filed Jun. 4, 1999, entitled "System and Method for Synchronizing Objects Between Two Devices," to Charles Wu, now U.S. Pat. No. 6,862,617, which claims priority to U.S. Provisional Application No. 60/103,859, filed Oct. 12, 1998, entitled "Flexible Grouping of Objects During Synchronization", to Charles Wu.

TECHNICAL FIELD

This invention relates to synchronizing one or more objects between two computing devices. More particularly, the invention relates to selectively synchronizing an object based on the accessibility of the storage volume that contains the object.

BACKGROUND OF THE INVENTION

Laptop, handheld, and other portable computers or computing devices have increased in popularity as the devices have become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on read-only memory (ROM)). Alternatively, one or more application programs may be installed by the user after purchasing the portable computer.

Many of these small computers have limited physical resources. For example, both primary and secondary memory are typically quite limited in comparison to desktop computers. In addition, small computers and other information processing devices often do not accommodate any form of removable mass storage such as floppy disks or optical disks. To make up for this deficiency, such computers are often capable of utilizing the resources of desktop computers or other base computers.

Initially, a base computer (such as a desktop computer) installs application programs on a smaller, more resource-limited portable computer, such as a laptop, handheld, or palmtop computer. Such application programs are typically distributed from their manufacturers on some type of non-volatile storage medium such as a floppy disk or a CD-ROM. Since the portable computer typically has no hardware to read such a storage medium, the portable computer is instead connected to communicate with the base computer, typically through a serial link. The base computer reads the application program from the non-volatile storage medium and downloads the program to the portable computer.

Portable computers that can receive application programs downloaded from a desktop computer are versatile and allow application programs to be replaced or upgraded easily. Typically, an installation application is run on the desktop computer that allows the user to select one or more application programs for downloading into the portable computer. After selecting the appropriate application programs, the installation application downloads the application programs to the portable computer.

The invention described herein relates to the synchronization of objects, such as databases, stored in portable computers with corresponding objects stored in a base computer. Some portable computers contain a built-in main memory as well as one or more slots or connectors to receive optional removable memory cards. Such memory cards allow a user to increase the memory resources of a portable computer. The additional memory resources can be used for storing one or more objects, storing additional application programs, or executing additional application programs simultaneously. The memory cards are removable from the portable computer, such that the objects or applications stored on the cards will become inaccessible if the card is removed or disconnected from the portable computer. Inaccessible objects cannot be synchronized with the corresponding objects on the base computer because the objects cannot be retrieved unless the memory card is coupled to the portable computer.

Typically, when a portable computer is synchronized with a base computer, objects that have been modified since the last synchronization process are synchronized such that the portable computer and the base computer contain identical objects. Further, during each synchronization process, if an object has been deleted on the portable computer or the base computer since the last synchronization process, then the corresponding object on the other system is also deleted. Thus, if a memory card containing a previously synchronized object is removed from the portable computer, then a synchronization process will delete the previously synchronized object from the base computer. Typically, the user of the system did not intend for the objects on the memory card to be deleted from the base computer during a synchronization process. For example, the user may have temporarily removed the memory card to allow the insertion of a different memory card containing different objects or application programs. In this example, the user has not deleted the object from the memory card. The object remains stored on the memory card, but the memory card has been temporarily removed from the portable computer.

Although the memory card containing a particular object was removed from the portable computer, the user may desire to continue accessing the object stored on the memory card using the base computer. However, if the object is deleted from the base computer during a synchronization process, the user must re-insert the memory card in the portable computer and complete a synchronization process to allow access to the object using the base computer. If the memory card containing the object is then removed from the portable computer, the next synchronization process will again delete the object from the base computer.

Therefore, it is desirable to provide a mechanism that prevents the synchronization of particular objects when one instance of the object is stored on a memory card or other storage device that has become inaccessible to the base computer or the portable computer.

SUMMARY OF THE INVENTION

The invention described herein selectively synchronizes objects between two devices. The synchronization is performed such that an object stored on a storage device (such as a memory card) that has become inaccessible to a portable computer is not synchronized with a base computer, thereby preventing the deletion of the object from the base computer. Although the object on the inaccessible storage device is not synchronized, the base computer continues to monitor and record changes made to the corresponding object stored on the base computer. After the storage device becomes accessible (e.g., is re-inserted into the portable computer), a synchronization process is performed such that the two instances of the object are again synchronized. This configuration allows the user to continue accessing an object through the base computer, even when the storage device on which the object is stored is no longer accessible to the portable computer. Thus, the user of the portable computer can temporarily remove storage cards from the portable computer without concern that objects stored on the removed card will be deleted from the base computer.

In a particular implementation of the invention, objects are synchronized between a base computer and a portable computer. The portable computer is capable of communicating with a storage volume that can become inaccessible to the portable computer. Storage volumes currently accessible to the portable computer are identified, and only objects contained in those identified storage volumes are synchronized with the base computer.

In another implementation of the invention, the synchronization process ignores objects stored on storage volumes that are not currently accessible to the portable computer.

Using another aspect of the invention, the base computer continues to monitor and record changes to objects stored on storage volumes that are inaccessible to the portable computer. These changes are synchronized with the portable computer when the previously inaccessible storage volume containing the object becomes accessible.

BRIEF DESCRIPTION OF THE DRAWINGS

FIG. 7 is a flow diagram illustrating an exemplary procedure for synchronizing objects between a portable computer and a desktop computer.

DETAILED DESCRIPTION

Figure 1:
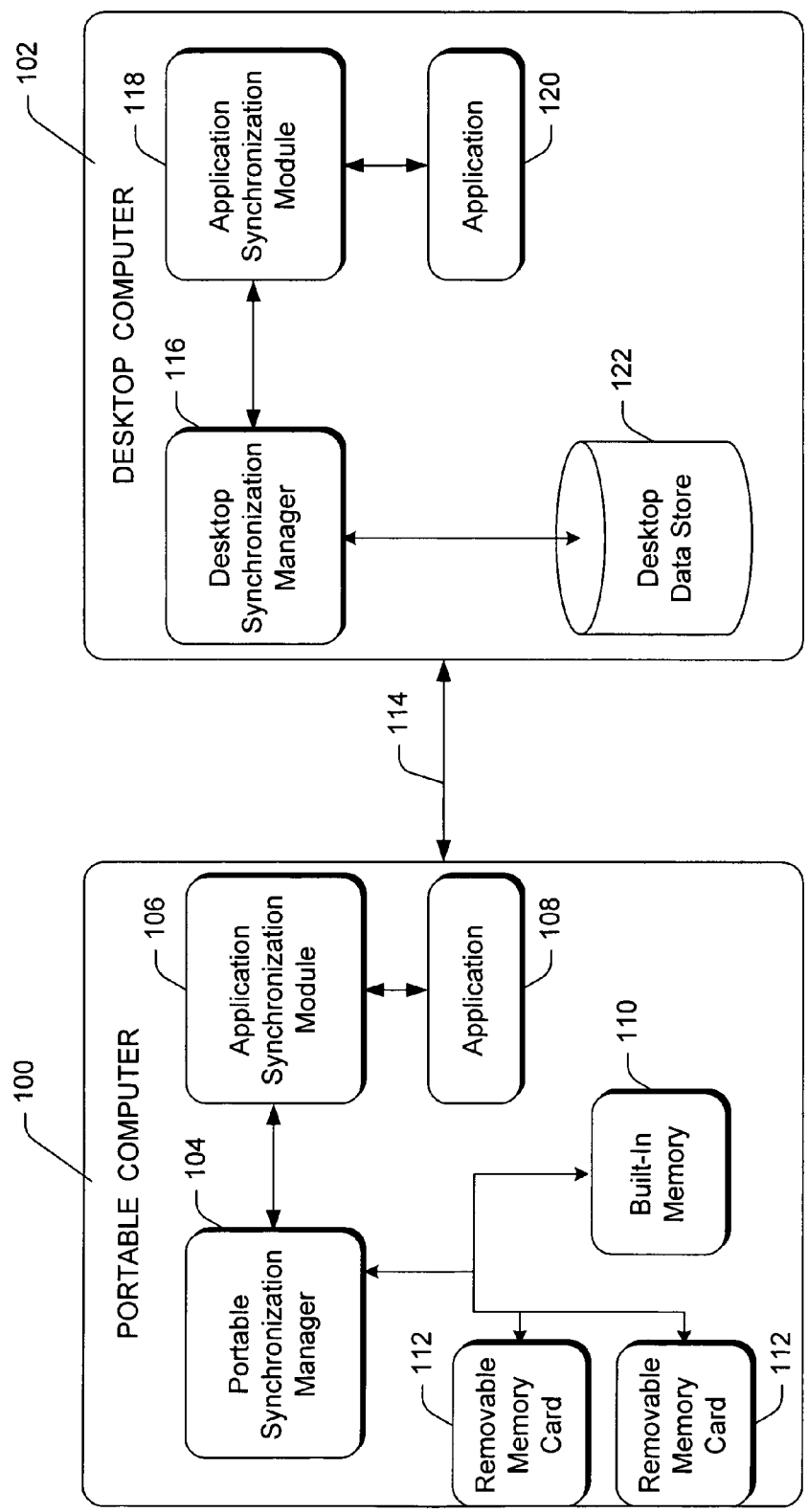
FIG. 1 illustrates an exemplary portable computer and an exemplary base computer in accordance with the invention.

FIG. 1 illustrates an exemplary portable computer 100 and an exemplary desktop computer 102 in accordance with the invention. Desktop computer 102 is also referred to herein as a "base computer." Portable computer 100 can be any type of laptop, palmtop, handheld, or other computing device capable of receiving application programs from a base computer such as desktop computer 102.

Portable computer 100 includes a portable synchronization manager 104, which is responsible for coordinating synchronization of objects stored on the portable computer with corresponding objects on base computer 102. An object can be a database or any other data structure capable of being synchronized between two computing devices and/or storage devices. Each object contains multiple data items (also referred to as "data entries" or "records"). The term "synchronization" refers to a process in which changes to one database are automatically reflected in one or more separately stored copies of the database. In the described embodiment, synchronization involves two copies of a database, each containing multiple corresponding entries, items, or records. Changes might be made to an entry in one of the database copies. During synchronization, those changes are implemented on the corresponding entry residing on the other database copy. If the same entry has been changed on both databases, the user is prompted to resolve the conflict by selecting one of the different versions of the entry to discard. When a new entry is created in one of the databases, it is duplicated on the other database during synchronization. When an entry is deleted from one database, it is deleted from the other database during synchronization.

The base computer and portable computer are each capable of executing multiple different application programs. Different object types can be associated with each application. For example, a personal contact manager application utilizes an associated object which is a database containing contact information accessed by the contact manager application. Depending on the number of contact entries, the contact manager application may create multiple objects (i.e., databases)—one for each category of contacts. In a particular example, the contact manager application creates two objects, one for storing personal contact information and another for storing work-related contact information.

Portable computer 100 includes a limited amount of built-in memory 110 as well as one or more removable memory cards 112. Removable memory cards 112 may also be referred to as "storage cards" or "memory expansion units." A portion of built-in memory 110 is addressable memory for program execution, and the remaining portion is used to simulate secondary disk storage. The removable memory cards 112 may contain permanently installed applications, such as applications stored in a read-only memory (ROM), not shown. Additionally, a removable memory card 112 may contain non-volatile memory for storing objects (such as databases) or downloaded application programs, thereby supplementing built-in memory 110. Memory cards 112 allow the user of portable computer 100 to customize the device by adding application programs or adding memory for storing additional objects and downloading additional application programs.

Portable computer 100 typically contains one or more applications 108. Applications 108 may include word processing applications, spreadsheet applications, contact manager applications, and game applications. Although shown as a separate block in FIG. 1, each application 108 is stored in built-in memory 110 or in a removable memory card 112. For each application 108 executing on portable computer 100, an application synchronization module 106 is provided. The application synchronization module 106 is familiar with the objects used by the associated application 108. This object knowledge is used by application synchronization module 106 and communicated to portable synchronization manager 104 during the synchronization process.

Each storage device in portable computer 100 is divided into one or more storage volumes. A storage volume contains one or more objects capable of being synchronized with corresponding objects in the base computer 102. In one embodiment, the operating system of the portable computer 100 or the base computer 102 is responsible for creating and defining storage volumes. Input from the user of the portable computer or base computer can influence the creation and definition of storage volumes. In other embodiments, the application synchronization module 106 is responsible for creating and defining storage volumes based on its knowledge of the associated application 108.

In an exemplary portable computer 100, a removable memory card 112 is represented as a single storage volume and contains one object—a database used by a contact manager application. Another removable memory card 112 in the portable computer 100 is also represented as a single storage volume, but contains multiple objects, such as a separate object for each stock portfolio database used by a portfolio tracking application. The built-in memory 110 of the portable computer 100 is divided into three storage volumes, in which each storage volume is used by a different type of application (e.g., an appointment application, a task list application, and a notepad application).

Each storage volume is assigned a globally unique identifier (GUID)—also referred to as a universally unique identifier (UUID). The assignment of a GUID is necessary to properly track all storage volumes that may become accessible to the portable computer. In one implementation of the invention, the GUID is a 16 byte identifier generated by the operating system upon creation of the storage volume. In addition to the GUID, each storage volume typically has a name (such as a file name) that is not necessarily unique. Thus, two different memory cards may be named "stock_portfolios", but the two memory cards will have different identifiers. In addition to volume identifiers, each object has an associated object identifier. Each object stored on the portable computer 100 has an associated identifier and each object stored on the base computer 102 has an associated identifier. Typically, the two identifiers are not identical, thereby requiring a mapping table or similar mechanism for correlating the two object identifiers. Although the volume identifiers are unique, the individual objects stored on the storage volumes do not require unique identifiers.

Portable computer 100 is designed to take advantage of a base computer's hardware resources. Particularly, portable computer 100 is designed so that application programs and other data can be read from a distribution medium by base computer 102, and then downloaded to portable computer 100. Portable computer 100 is thus referred to as a peripheral computer or an auxiliary computer, in that it is controlled during this process by base computer 102.

To allow communications between base computer 102 and portable computer 100, the two computers are coupled to one another through a communication link 114. Typically, communication link 114 is a temporary bidirectional communication link established to exchange data between portable computer 100 and base computer 102. Communication link 114 is used, for example, to synchronize objects between base computer 102 and portable computer 100. Communication link 114 can also be used to download applications and other data from base computer 102 to portable computer 100. In a particular embodiment, communication link 114 is a serial communication link. However, communication link 114 can utilize any type of communication medium and any type of communication protocol to exchange data between portable computer 100 and base computer 102.

Base computer 102 in the described embodiment is a conventional personal desktop computer. However, other types of computers might be used in this role. Base computer 102 includes a desktop synchronization manager 116, which operates in combination with portable synchronization manager 104 in portable computer 100 to coordinate the synchronization of objects between base computer 102 and portable computer 100. As discussed in greater detail below, desktop synchronization manager module 116 also maintains the status of each storage volume on the portable computer 100. If a particular storage volume in portable computer 100 is not accessible, then desktop synchronization manager 116 does not attempt to synchronize objects stored in the inaccessible volume.

Base computer 102 typically contains multiple applications 120. Applications 120 may include applications similar to applications 108 stored on portable computer 100 as well as other applications not associated with the synchronization process. For each application on base computer 102, an application synchronization module 118 is provided. The application synchronization module 118 is coupled to desktop synchronization manager 116 and its associated application 120. The application synchronization module 118 is familiar with the objects used by the associated application 120. This object knowledge is used by application synchronization module 118 and communicated to desktop synchronization manager 116 during the synchronization process. Specifically, desktop synchronization manager 118 determines which objects are stored on storage volumes that are accessible to the portable computer 100 and synchronizes only those accessible objects. Base computer 102 also comprises a desktop data store 122 coupled to the desktop synchronization manager 116. Data store 122 stores information necessary to perform the synchronization process, such as the status (e.g., accessible or inaccessible) of each storage volume used with portable computer 100.

Although an object stored on portable computer 100 can be synchronized with a corresponding object on base computer 102, the two objects do not necessarily share the same data structure or data storage format. For example, an object stored on the portable computer 100 is created using a contact management program proprietary to the manufacturer of the portable computer using the manufacturer's data structure. That object is synchronized with a corresponding object on the base computer 102. The object on the base computer is accessed using an application program different than the contact management program on the portable computer. The base computer application uses a different data structure to store the various information contained in the object. The two application synchronization modules 106 and 118 operate in combination with portable synchronization manager 104 and desktop synchronization manager 116 to ensure that the two objects are properly synchronized and the appropriate data structures are maintained. This may involve translating and/or converting the items or entries in one object to a different format or structure in the corresponding object, such that the corresponding object can be accessed by the appropriate application.

The synchronization process is performed independently of the application programs that create and modify the objects being synchronized. The portable synchronization manager 104 and the desktop synchronization manager 116 do not interpret or understand the data entries contained within the synchronized objects. Therefore, the two synchronization managers 104 and 116 merely ensure that the two objects are properly synchronized. Similarly, the applications 108 and 120 create and modify objects, but do not participate in the synchronization process.

As mentioned above, corresponding objects on the portable computer 100 and the base computer 102 typically have different identifiers. The desktop synchronization manager 116 maintains a mapping table of all object identifiers. The mapping table also includes information regarding the volume identifier associated with the objects as well as information regarding whether the object has been changed or deleted since the last synchronization process. Table 1 illustrates an exemplary table maintained by desktop synchronization manager 116.

TABLE 1

| Volume ID | Portable Object ID | Desktop Object ID | Changed | Deleted | Application Information |
|---|---|---|---|---|---|
| 00 | Object1 | Object2A | 0 | 0 | |
| 01 | Object2 | Object34 | 1 | 0 | |
| 02 | Object3 | Object1F | 0 | 0 | |
| 03 | Object4 | Object27 | 0 | 1 | |

The Volume ID in Table 1 represents the GUID assigned to a particular storage volume in the portable computer 100. The GUID is represented in Table 1 by a one-byte index rather than using the entire 16 byte GUID. Another table or listing (not shown) is used to identify whether a particular volume is active or inactive (i.e., accessible or inaccessible). The corresponding Object IDs are provided in the next two columns of Table 1. The Portable Object ID represents the name of the object used by the portable computer 100 and the Desktop Object ID represents the name of the object used by the desktop computer 102. The Changed and Deleted bits indicate whether an object has been changed or deleted since the last synchronization process. For example, a "0" indicates that the object has not changed or has not been deleted, and a "1" indicates that the object has been modified or deleted since the last synchronization process. The last column in Table 1 is available for storing other information required by particular application programs that have responsibility for the corresponding Volume ID. This information can vary from one application program to another. Certain application programs may not require any other information (in which case, the last column of Table 1 is empty. When performing the synchronization process, only objects associated with active volumes are synchronized. All inactive volumes, and the objects stored on those volumes, are ignored during the synchronization process.

Figure 2:
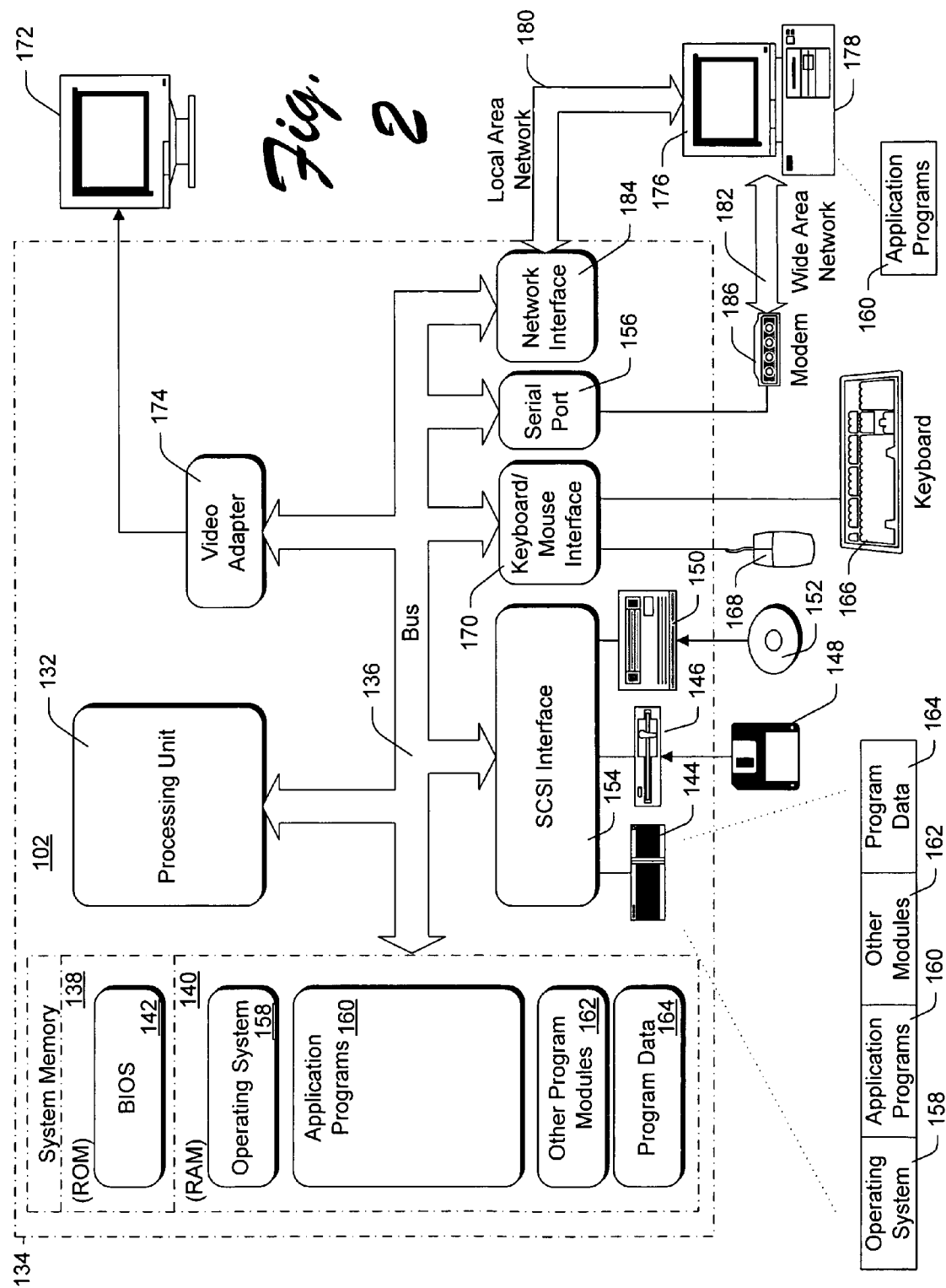
FIG. 2 is a block diagram showing pertinent components of a base computer in accordance with the invention.

FIG. 2 shows a general example of a base computer 102 that can be used in accordance with the invention. Computer 102 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 102, such as during start-up, is stored in ROM 138.

Computer 102 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 102. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 102 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 102 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 102, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
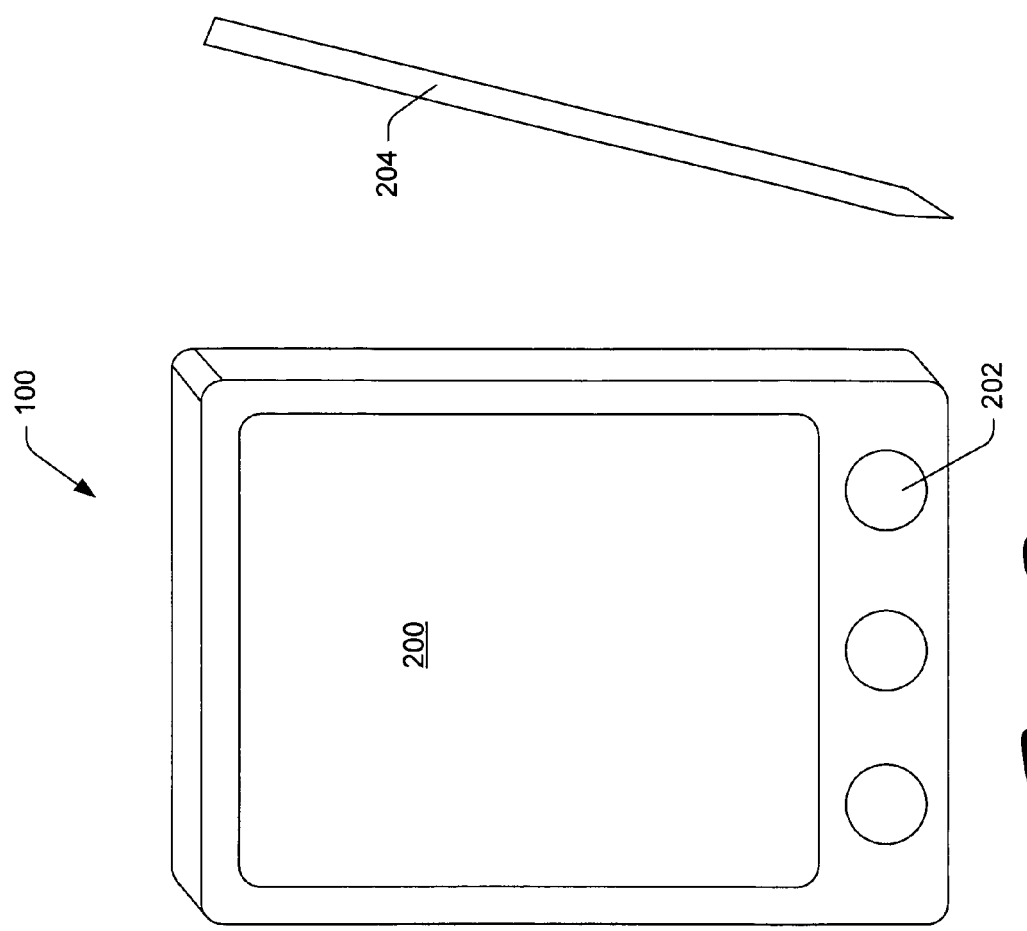
FIG. 3 illustrates an embodiment of a portable computer in accordance with the present invention.

FIG. 3 shows an embodiment of portable computer 100 for use with the present invention. For purposes of this description, the term "portable" is used to indicate a small computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like. In other implementations, the portable computer may be implemented as a personal digital assistant (PDA), a personal organizer, a palmtop (or handheld) computer, a computerized notepad, or the like.

Portable computer 100 includes an LCD display 200 and several user input keys or buttons 202. The LCD display 200 is a touch-sensitive screen which, when used in conjunction with a stylus 204, allows a user to input information to portable computer 100. The stylus 204 is used to press the display at designated coordinates for user input. Buttons 202 provide another mechanism for user input. A particular portable computer may have any number of buttons for user input. Although not shown in FIG. 3, portable computer 100 also includes one or more slots or other connectors capable of receiving removable memory cards.

Figure 4:
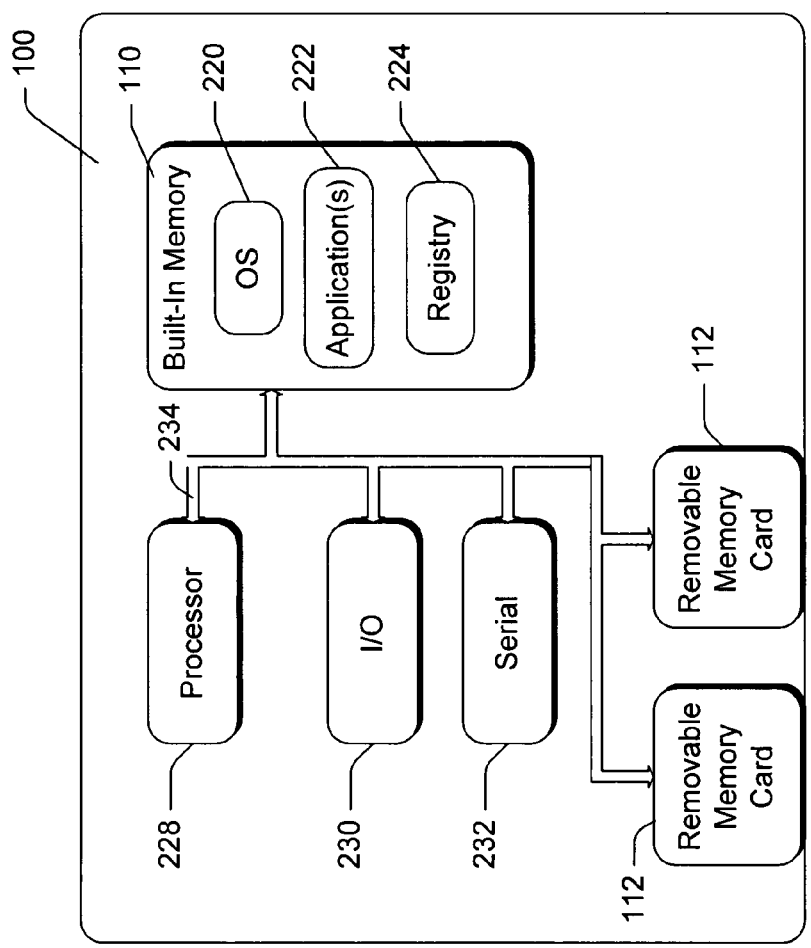
FIG. 4 is a block diagram illustrating pertinent components of a portable computer in accordance with the invention.

FIG. 4 is a block diagram illustrating pertinent components of the portable computer 100. Portable computer 100 includes built-in memory 110 and one or more removable memory cards 112. Built-in memory 110 includes an operating system 220, one or more application programs 222, and a registry 224. Additionally, portable computer 100 has a processor 228, I/O components 230 (including the display 200 and buttons 202 in FIG. 3), and a serial interface 232 for communicating with other computing devices (such as base computer 102 or another portable computer 100). In one embodiment, the various components in portable computer 100 communicate with one another over a bus 234. In an exemplary embodiment of portable computer 100, built-in memory 110 is a non-volatile electronic memory such as a random access memory (RAM) with a battery back-up module, not shown. In an alternate embodiment, built-in memory 110 is implemented using a flash memory device. Part of this built-in memory 110 is addressable memory for program execution, and the remaining part is used to simulate secondary disk storage.

Operating system 220 executes on processor 228 from built-in memory 110. In a particular embodiment of the invention, portable computer 100 runs the "Windows CE" operating system manufactured and distributed by Microsoft Corporation of Redmond, Wash. This operating system is particularly designed for small computing devices.

Application programs 222 execute from built-in memory 110 of portable computer 100. The number of application programs 222 that can be simultaneously installed on portable computer 100 is a function of the portion of built-in memory allocated to store application programs and the size of the application programs 222 currently installed. In addition, application programs can be installed on removable memory cards 112 as described below.

The registry 224 is a database that is implemented in various forms under different versions of the "Windows" operating systems. The registry contains information about applications stored on portable computer 100. Exemplary registry information includes user preferences and application configuration information.

Figure 5:
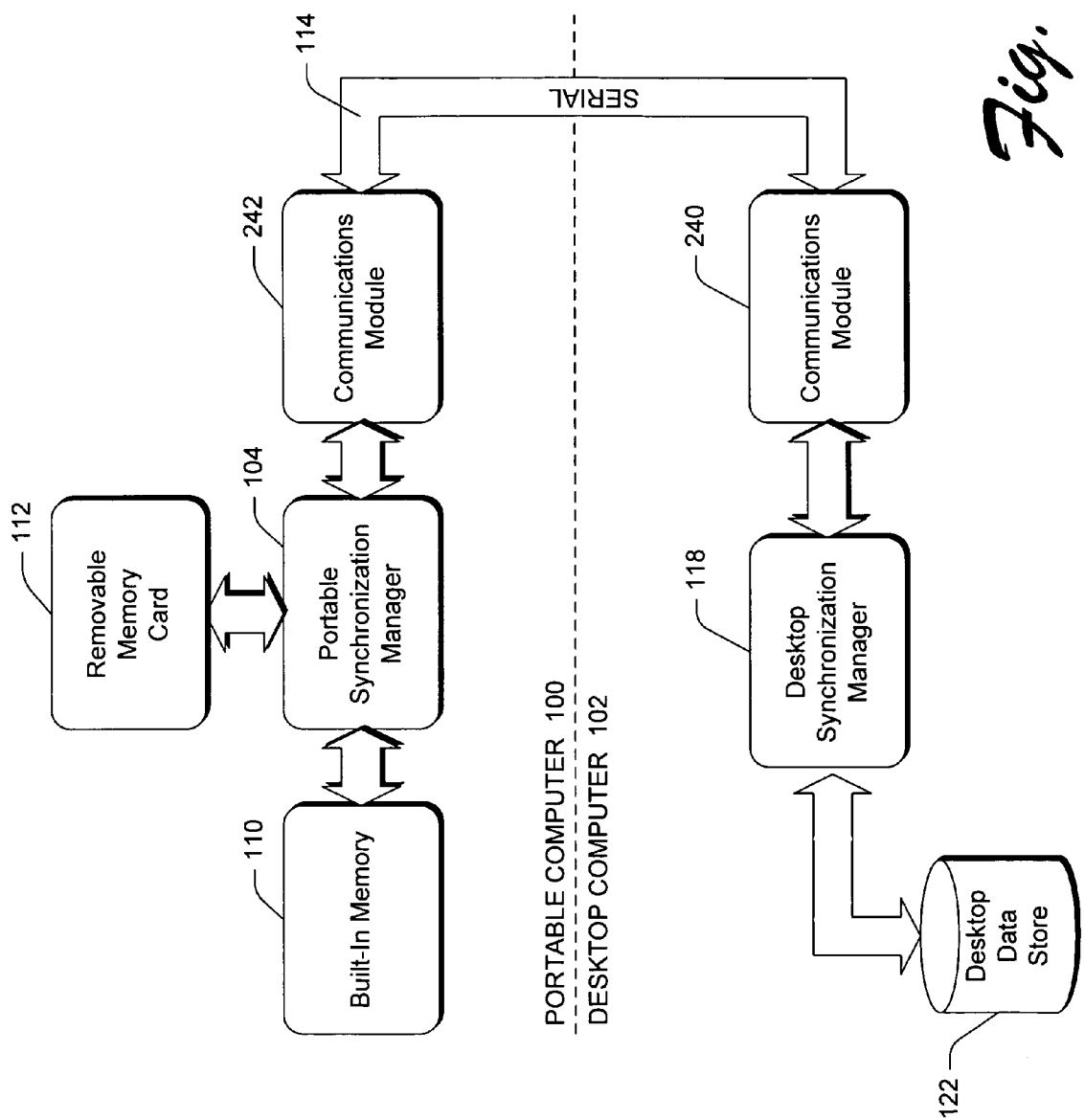
FIG. 5 is an architectural diagram of a system in accordance with the invention for synchronizing objects between a portable computer and a desktop computer.

FIG. 5 is an architectural diagram of a system in accordance with the invention for synchronizing objects between portable computer 100 and base computer 102. As discussed above, desktop synchronization manager 118 coordinates the synchronization of objects by determining which objects are stored on storage volumes accessible to the portable computer 100 and synchronizing only those objects that are accessible to the portable computer. Portable synchronization manager 104 operates in combination with desktop synchronization manager 118 to synchronize objects stored on the portable computer with corresponding objects on base computer 102.

Communications modules 240 and 242 are implemented on base computer 102 and portable computer 100, respectively. These communications modules implement serial communications between the base computer and the portable computer using a serial connection 114 (e.g., a serial cable or an infrared link). Desktop synchronization manager module 118 communicates with various operating system components of portable computer 100 through these communications components.

Figure 6:
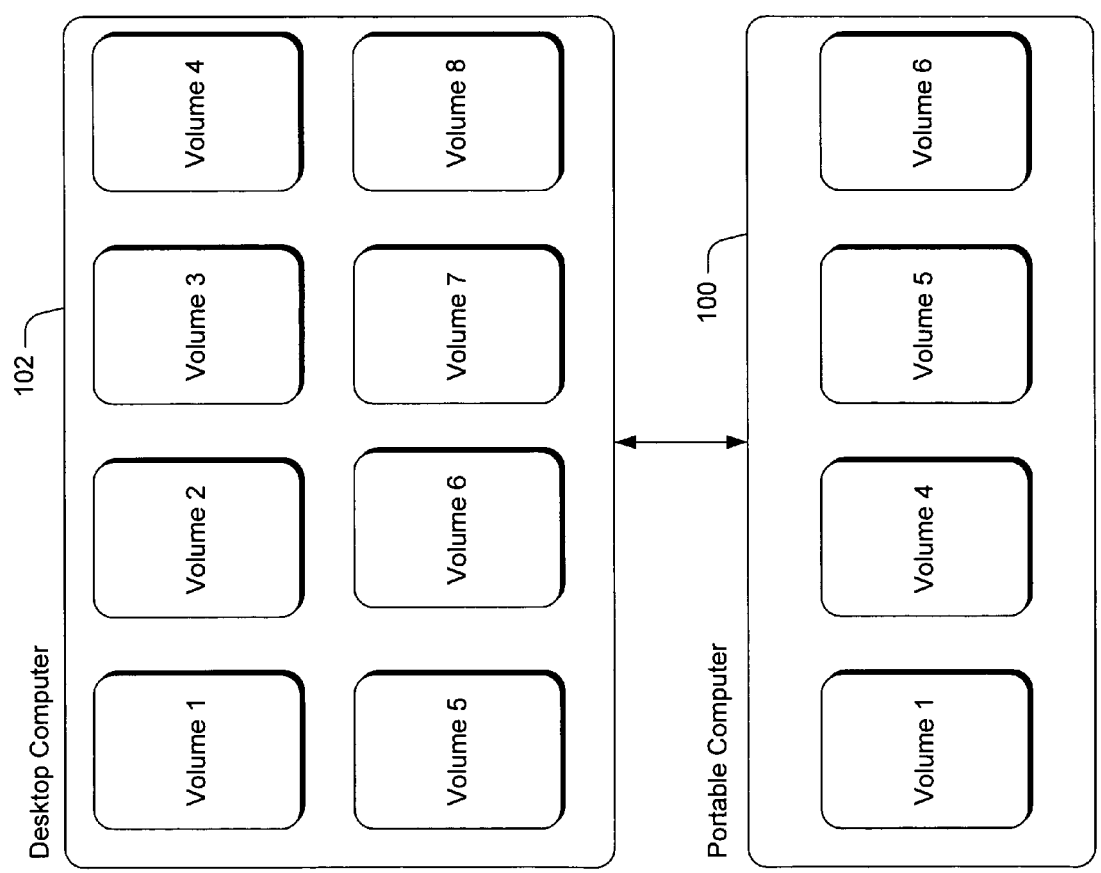
FIG. 6 illustrates multiple volumes currently stored on a portable computer and a desktop computer.

FIG. 6 illustrates multiple volumes currently stored on portable computer 100 and base computer 102. Each volume contains one or more objects that are synchronized with corresponding objects in a corresponding volume on the other device. In the example of FIG. 6, the base computer 102 contains eight volumes, labeled Volume 1 through Volume 8. These eight volumes represent all volumes that have been accessible to portable computer 100 during previous synchronization processes and that have not been deleted from the storage devices of the portable computer. Each volume in the desktop computer contains one or more objects. These objects represent a copy of the objects that were stored in the corresponding portable computer volume during the most recent synchronization process (i.e., the most recent synchronization process during which the corresponding portable computer volume was accessible to the portable computer).

As shown in FIG. 6, portable computer 100 currently has four accessible volumes (Volumes 1, 4, 5, and 6) and four inaccessible volumes (Volumes 2, 3, 7, and 8). The four inaccessible volumes can be determined by identifying volumes that are currently stored in the base computer (i.e., previously synchronized when the volumes were accessible to the portable computer) but are not currently accessible to the portable computer. The four inaccessible volumes may be removable memory cards that have been removed from the portable computer 100 or some other type of storage device that can become temporarily inaccessible to the portable computer (such as an interrupted network connection or a database that is currently off-line). If a synchronization process is initiated with the volumes configured as shown in FIG. 6, objects stored on Volumes 1, 4, 5, and 6 of portable computer 100 will be synchronized with corresponding Volumes 1, 4, 5, and 6 of base computer 102. Objects on any of the other four volumes (Volumes 2, 3, 7, or 8) will not be synchronized until the removable memory card containing one or more of the objects is re-inserted into the portable device. Changes made to any objects stored on Volumes 2, 3, 7, or 8 of base computer 102 will be monitored and recorded by the desktop computer. During the next synchronization of each modified object, the recorded changes will be entered.

FIG. 7 is a flow diagram illustrating an exemplary procedure for synchronizing objects between a portable computer 100 and a base computer 102. At step 250, the portable synchronization manager 104 identifies volumes that are currently accessible to the portable computer. A function such as "FindObjects" is useful to identify all accessible volumes (and the objects stored in those volumes) in the portable computer 100. The FindObjects function is used by the portable synchronization manager 104 to call each application synchronization module 106, which is associated with a particular application 108. Each application synchronization module 106 returns to the portable synchronization manager 104 a list of known volumes (and associated objects) that are currently accessible.

The FindObjects function identifies a particular accessible volume in portable computer 100 and identifies all objects associated with the particular volume that need to be synchronized. The objects that need to be synchronized are those that have been modified since previously synchronizing the particular volume. The FindObjects function then returns a list of the identified objects to the portable synchronization manager 106 along with a volume identifier associated with the volume containing the identified objects. The portable synchronization manager 104 then calls the FindObjects function a second time, which allows the application synchronization manager 104 to release resources by deleting the list of objects identified as a result of the first call of FindObjects. The second call of FindObjects causes FindObjects to determine whether additional volumes remain on the portable computer 100 that may contain objects that require synchronization. This second call of the function returns an indication of whether additional volumes remain. If additional volumes remain, then the FindObjects function is called again to retrieve the objects associated with another volume.

After all application synchronization modules 106 have responded (using the FindObjects function) with a list of accessible volumes and associated objects, the portable synchronization manager 104 consolidates the multiple lists and communicates the consolidated list of accessible volumes to the desktop synchronization manager 116 (step 252).

At step 254, the desktop synchronization manager 116 retrieves a list of volumes previously accessible to the portable computer 100. Once a volume has been identified as accessible to the portable computer, the desktop synchronization manager 116 maintains that volume identifier in the list of previously accessible volumes, regardless of the number of synchronization cycles that have been performed in which the volume was not accessible.

Step 256 comprises comparing the list of previously accessible volumes with the list of currently accessible volumes (retrieved in step 254) on the portable computer 100. Each entry in the list of previously accessible volumes indicates the status of the volume at the time of the last synchronization process. The volume status is indicated as either active (i.e., accessible) or inactive (i.e., inaccessible). Each volume in the list of currently accessible volumes is compared to the corresponding volume in the list of previously accessible volumes to determine whether the status of the volume has changed since the last synchronization process. Also, the list of previously accessible volumes is analyzed to see if any volume having an active status has become inactive (i.e., not on the list of currently accessible volumes).

If a volume is currently accessible and was previously accessible, then the volume's status remains active (step 258). If a particular volume is not currently accessible, but was previously accessible, then the volume's status is set to inactive (step 260). If a volume is currently accessible, but was not previously accessible, then the volume is added to the list of previously accessible volumes and the volume's status is set to active (step 262). After comparing each volume and updating the status of the volumes in the list of previously accessible volumes (if necessary), the portable computer 100 and the base computer 102 are synchronized. The synchronization process is initiated by the desktop synchronization manager at step 264. During the synchronization process, objects that have changed since the previous synchronization process and are stored in active volumes are synchronized between the portable computer 100 and the base computer 102. Objects stored on inactive volumes are not synchronized, regardless whether the objects have changed since the previous synchronization. Thus, if an object is stored on a removable memory card that is inactive (i.e., removed from the portable device), the corresponding object on the base computer is not deleted. Further, the object on the base computer can be modified using its associated application program. The desktop synchronization manager 116 continues to monitor and record changes made to objects in inactive volumes (step 266), thereby allowing synchronization of the changes with the portable computer 100 when the volume again becomes active.

Particular embodiments of the invention are described above with reference to a portable computer having one or more removable memory cards. However, the teachings of the present invention can be applied to any computing device capable of accessing a storage device that may become inaccessible. The inaccessibility may be caused by a broken or disabled connection between the storage device and the computing device or insufficient bandwidth to communicate data between the storage device and the computing device. Additionally, some or all of the data on a storage device may be temporarily unavailable or "off-line", thereby causing the data to be inaccessible.

Thus, as described above, the invention provides a system and method for selectively synchronizing objects between two devices. The synchronization is performed such that objects stored on inaccessible storage devices are not synchronized. Although the objects stored on inaccessible storage devices are not synchronized, the base computer continues to monitor and record changes made to the corresponding objects stored on the base computer. When the previously inaccessible storage device becomes accessible, a synchronization process is performed such that the two instances of the object are again synchronized. The invention allows the user to continue accessing an object through the base computer, although the storage device on which the object is stored is no longer accessible to the portable computer. Thus, the user of the portable computer can temporarily remove storage cards from the portable computer without concern that objects stored on the removed card will be deleted from the base computer or otherwise made inaccessible by the base computer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A synchronization manager for a base computing device, comprising:
   a volume identifier to identify storage volumes currently accessible to a portable computing device coupled with the base computing device;
   a deletion identifier to determine objects subject to deletion from the base computing device during a synchronization process to occur between the portable computing device and the base computing device;
   a blocker to prevent deletion of the objects subject to deletion during the synchronization process; and
   a synchronizer to synchronize objects contained in the storage volumes currently accessible to the portable computing device.

2. The synchronization manager as recited in claim 1, further comprising an updater to continue monitoring and recording changes to objects in the base computing device when the storage volume is inaccessible to the portable computing device.

3. The synchronization manager as recited in claim 2, further comprising a synchronicity maintainer for immediately synchronizing, without user intervention, an object contained in one of the storage volumes not coupled with the portable computing device when the storage volume becomes accessible to the portable computing device.

4. The synchronization manager as recited in claim 3, wherein the object comprises a plurality of data items, and wherein the synchronicity maintainer synchronizes data items in the object.

5. The synchronization manager as recited in claim 4, wherein the object comprises a database.

6. The synchronization manager as recited in claim 1, wherein the storage volume that can become inaccessible to the portable computing device comprises a removable memory card.

7. The synchronization manager as recited in claim 1, wherein the storage volume that can become inaccessible to the portable computing device comprises a removable disk drive.

8. The synchronization manager as recited in claim 1, wherein the storage volume that can become inaccessible to the portable computing device comprises a removable flash drive.

* * * * *